(12) United States Patent
Mittal et al.

(10) Patent No.: US 10,237,230 B2
(45) Date of Patent: Mar. 19, 2019

(54) METHOD AND SYSTEM FOR INSPECTING NETWORK TRAFFIC BETWEEN END POINTS OF A ZONE

(71) Applicant: Arista Networks, Inc., Santa Clara, CA (US)

(72) Inventors: Anuraag Mittal, Santa Clara, CA (US); Aparna Karanjkar, Santa Clara, CA (US); Nitin Ravindra Karkhanis, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 48 days.

(21) Appl. No.: 15/653,815

(22) Filed: Jul. 19, 2017

(65) Prior Publication Data

US 2019/0028424 A1   Jan. 24, 2019

(51) Int. Cl.
*H04L 12/46* (2006.01)
*H04L 29/12* (2006.01)
*H04L 12/26* (2006.01)
*H04L 12/64* (2006.01)
*H04L 12/741* (2013.01)
*H04L 29/06* (2006.01)

(52) U.S. Cl.
CPC ........ *H04L 61/103* (2013.01); *H04L 12/4641* (2013.01); *H04L 12/6418* (2013.01); *H04L 43/10* (2013.01); *H04L 45/74* (2013.01); *H04L 43/12* (2013.01); *H04L 69/16* (2013.01)

(58) Field of Classification Search
CPC . H04L 49/70; H04L 12/4641; H04L 12/4633; H04L 49/357; H04L 45/745; H04L 45/586; H04L 12/66; H04L 45/02; H04L 45/74; H04L 41/12
See application file for complete search history.

(56) References Cited

U.S. PATENT DOCUMENTS

| | | | |
|---|---|---|---|
| 2016/0036703 A1* | 2/2016 | Josyula | H04L 45/66 370/392 |
| 2017/0099182 A1 | 4/2017 | DeBolle et al. | |
| 2017/0346736 A1* | 11/2017 | Chander | H04L 45/745 |
| 2018/0123827 A1* | 5/2018 | Josyula | H04L 12/4641 |

* cited by examiner

*Primary Examiner* — Sai Aung
(74) *Attorney, Agent, or Firm* — Chamberlain, Hrdlicka, White, Williams & Aughtry

(57) ABSTRACT

In general, embodiments of the disclosure relate to a method for handling media access control (MAC) frames. The method includes receiving, by a service virtual tunnel end point (VTEP) and from a source VTEP, a first virtual layer-3 (VL3) frame comprising a dedicated virtual network identifier (VNI), decapsulating the first VL3 frame to obtain a first media access control (MAC) frame comprising a dedicated virtual local area network (VLAN) tag, replacing, in the first MAC frame, the dedicated VLAN tag with an original VLAN tag, and bridging the first MAC frame to a service device directly connected to a first network element on which the service VTEP is executing.

20 Claims, 9 Drawing Sheets

METHOD AND SYSTEM FOR INSPECTING NETWORK TRAFFIC BETWEEN END POINTS OF A ZONE

BACKGROUND

Typically, the insertion of a transparent service device in the network traffic path between end points results in the segmentation of the layer-2 (L2) domain into two zones. All end points in any given zone can communicate directly with one another while communication between end points in different zones traverses through the service device.

SUMMARY

In general, in one aspect, the disclosure relates to a method for handling media access control (MAC) frames. The method includes receiving, by a service virtual tunnel end point (VTEP) and from a source VTEP, a first virtual layer-3 (VL3) frame comprising a dedicated virtual network identifier (VNI), decapsulating the first VL3 frame to obtain a first MAC frame comprising a dedicated virtual local area network (VLAN) tag, replacing, in the first MAC frame, the dedicated VLAN tag with an original VLAN tag, and bridging the first MAC frame to a service device directly connected to a first network element on which the service VTEP is executing.

In general, in one aspect, the disclosure relates to a system. The system includes a service device, a plurality of network elements operatively connected to one another and the service device, a source virtual tunnel end point (VTEP) executing on a first network element of the plurality of network elements, and a service VTEP executing on a second network element of the plurality of network elements, and configured to: receive, from the source VTEP, a first virtual layer-3 (VL3) frame comprising a dedicated virtual network identifier (VNI), decapsulate the first VL3 frame to obtain a first media access control (MAC) frame comprising a dedicated virtual local area network (VLAN) tag, replace, in the first MAC frame, the dedicated VLAN tag with an original VLAN tag, and bridge the first MAC frame to the service device, wherein the service device is directly connected to the second network element.

In general, in one aspect, the disclosure relates to a non-transitory computer readable medium (CRM) comprising computer readable program code, which when executed by a computer processor, enables the computer processor to: receive, at a service virtual tunnel end point (VTEP) and from a source VTEP, a first virtual layer-3 (VL3) frame comprising a dedicated virtual network identifier (VNI), decapsulate the first VL3 frame to obtain a first media access control (MAC) frame comprising a dedicated virtual local area network (VLAN) tag, replace, in the first MAC frame, the dedicated VLAN tag with an original VLAN tag, and bridge the first MAC frame to a service device directly connected to a first network element on which the service VTEP is executing.

Other aspects of the disclosure will be apparent from the following description and the appended claims.

DETAILED DESCRIPTION

Figure 1:
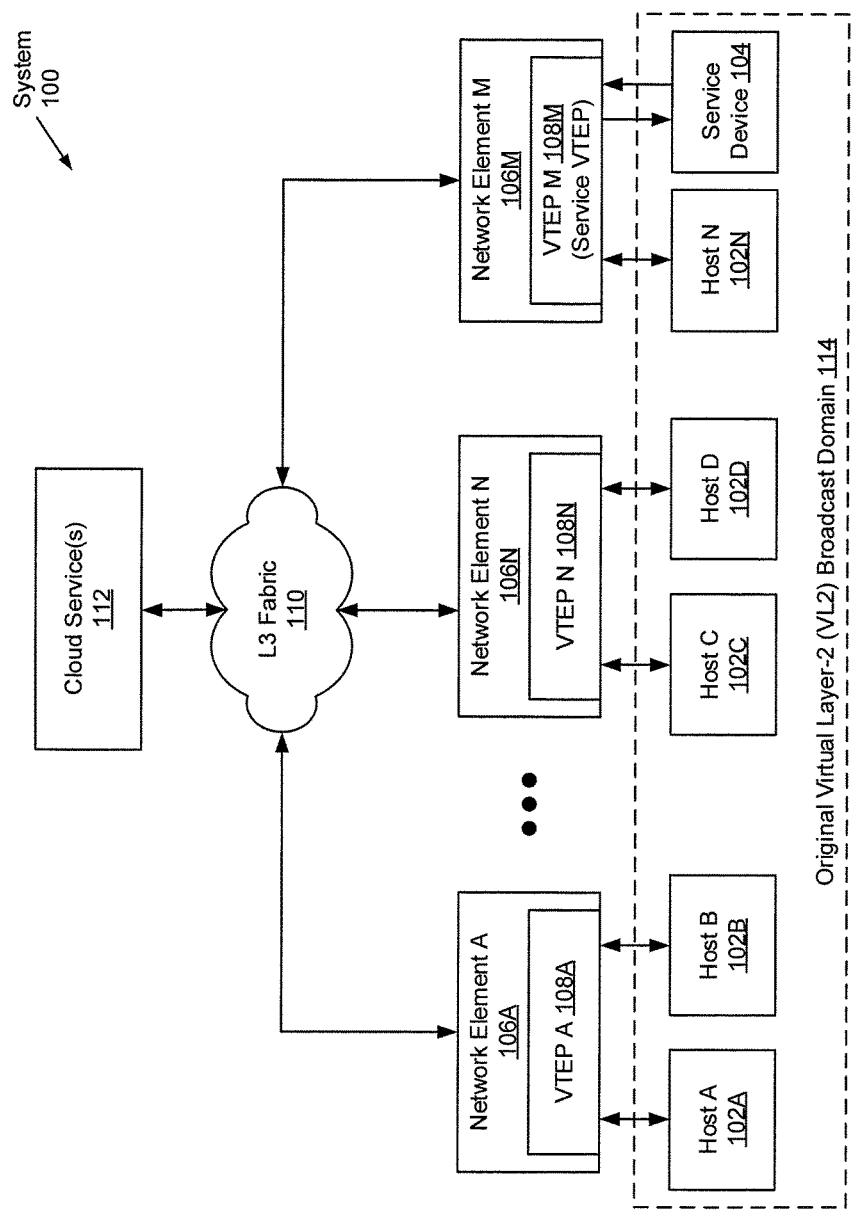
FIG. 1 shows a system in accordance with one or more embodiments of the disclosure.

Specific embodiments of the disclosure will now be described in detail with reference to the accompanying figures. In the following detailed description of the embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In the following description of FIGS. 1-5, any component described with regard to a figure, in various embodiments of the disclosure, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure relate to a method and system for inspecting network traffic between end points of a zone. Specifically, one or more embodiments of the disclosure entails the provisioning of a dedicated virtual network identifier (VNI) and corresponding dedicated virtual layer-2 (VL2) broadcast domain to intercept hosts (i.e., hosts whose network traffic, which may be directed to another host of the zone, is intercepted and redirected to a service device for inspection) of the zone. Further, returning network traffic to any of these aforementioned intercept hosts is assigned a common intercept VNI and corresponding common intercept VL2 broadcast domain through which the returning network traffic is communicated.

One or more embodiments of the disclosure hereinafter are described in conjunction with the virtual extensible local area network (VXLAN) layer-3 (L3) encapsulation and tunneling protocol. However, one of ordinary skill in the art will appreciate that the disclosure may be practiced alongside alternative tunneling mechanisms. These other tunneling mechanisms may include, for example, multi-protocol label switching (MPLS), generic routing encapsulation (GRE), and other existing or future developed tunneling mechanisms. The aforementioned tunneling mechanisms may be collectively referred to as virtual L3 (VL3) tunnels.

FIG. 1 shows a system in accordance with one or more embodiments of the disclosure. The system (100) includes one or more network element(s) (106A-106M) operatively connected to one or more cloud service(s) (112) through a layer-3 (L3) fabric (110). The system (100) further includes one or more host(s) (102A-102N), which are directly connected to the one or more network element(s) (106A-106M). On each network element (106A-106M), a respective virtual tunnel end point (VTEP) (108A-108M) may be executing. Moreover, the system (100) includes at least one service device (104), which is directly connected to at least one network element (e.g., 106M). In addition, the system (100) includes an original VL2 broadcast domain (114) employed by at least the one or more host(s) (102A-102N) and the at least one service device (104). Each of these components is described below.

In one embodiment of the disclosure, a network element (106A-106M) may be a physical device that includes persistent storage, memory (e.g., random access memory (RAM)), shared memory), one or more computer processor(s) (e.g., integrated circuits) (including a switch chip or network processor)), and two or more physical network interfaces or ports. The computer processor(s) (e.g., switch chip or network processor) may be hardware that determines out of which egress port on the network element (106A-106M) to forward media access control (MAC) frames. The computer processor(s) (e.g., switch chip or network processor) may include egress and ingress ports that may connect to the physical network interfaces or ports on the network element (106A-106M). Further, each physical network interface or port may or may not be connected to another component (e.g., a host (102A-102N), to another network element (106A-106M), to a service device (104), or to the L3 fabric (110)) in the system (100). A network element (106A-106M) may be configured to receive network packets via the network interfaces or ports, and determine whether to: (i) drop the network packet; (ii) process the network packet in accordance with one or more embodiments of the disclosure; and/or (iii) send the network packet, based on the processing, out another network interface or port on the network element (106A-106M).

How the network element (106A-106M) makes the determination of whether to drop a network packet, and/or send a network packet to another component in the system (100) depends, in part, on whether the network element (106A-106M) is a L2 switch or a L3 switch (also referred to as a multilayer switch), which may perform at least some functions of a router. If the network element (106A-106M) is operating as a L2 switch, the network element (106A-106N) uses the destination MAC address along with a forwarding table or policy to determine out of which network interface or port to send the network packet. If the network element (106A-106M) is operating as a L3 switch, the network element (106A-106M) uses the destination Internet Protocol (IP) address along with a routing table or policy to determine out of which network interface or port to send the network packet, and includes the ability to write the MAC address of the next hop (or component) to receive the network packet in place of its own MAC address (which the last hop or component to send the network packet wrote) in the L2 information encapsulating the network packet. If the network element (106A-106M) is a multilayer switch, the network element (106A-106M) includes functionality to process network packets using both MAC addresses and IP addresses.

In one embodiment of the disclosure, the persistent storage on a network element (106A-106M) may include any type of non-transitory computer readable medium that includes instructions, which, when executed by the one or more computer processor(s), enable the network element (106A-106M) to perform any of the functionalities described herein. Moreover, examples of a network element (106A-106M) include, but are not limited to, a switch, a router, and a multilayer switch. A network element (106A-106M) is not limited to the aforementioned specific examples.

In one embodiment of the disclosure, a network element (106A-106M) may include a VTEP (108A-108M). A VTEP (108A-108M) may be an entity (e.g., software) which originates and/or terminates virtual layer-3 (VL3) tunnels. Further, a VTEP (108A-108N) may be capable of: (i) encapsulating a MAC frame, generated by or obtained from an operatively connected host (102A-102N), a virtual machine (VM) (not shown) executing on a host (102A-102N), and/or service device (104); (ii) receiving a VL3 frame destined for an operatively connected (102A-102N), virtual machine (not shown), and/or service device (104) from a remote VTEP (108A-108M); and (iii) decapsulating (i.e., removing the VL3 frame header from) a received VL3 frame to obtain a MAC frame therein before delivering the MAC frame to an operatively connected host (102A-102N), virtual machine (not shown), and/or service device (104). In one embodiment of the disclosure, a VL3 frame may be a VXLAN frame, whereas the virtual tunnel through which VXLAN frames traverse may be a VXLAN tunnel. Embodiments of the disclosure are not limited to any specific implementation or protocol for generating/instantiating VL3 frames and/or virtual tunnels.

In one embodiment of the disclosure, a service VTEP may be described herein. A service VTEP (e.g., VTEP M (108M)) may refer to a VTEP executing on a network element (e.g., network element M (106M)) that is directly connected to a service device (104).

In one embodiment of the disclosure, the original VL2 broadcast domain (114) may be defined as the set of computing devices (e.g, hosts (102A-102N), virtual machines (not shown), and service devices (104)) that communicate using the same VNI (e.g., an original VNI), where the VNI is defined by, for example, the VXLAN protocol. A VNI identifies the scope of the MAC frame originated by a computing device such that the MAC frame may only be sent to another computing device associated with the same VNI. In one embodiment of the disclosure, a MAC frame may be sent to a computing device associated with a different VNI if the MAC frame is routed into a new VL2 broadcast domain (not shown). By way of examples, the original VL2 broadcast domain (114) may be implemented as a virtual local area network (VLAN) domain and/or a VXLAN domain. Embodiments of the disclosure are not limited to these specific examples.

In one embodiment of the disclosure, a host (102A-102N) may be any type of system (e.g., software and computer hardware) that is configured to generate, send, receive, and/or process requests and replies either locally or over a network using software and computer hardware. A host (102A-102N) may include one or more processor(s), memory, and one or more physical network interface(s).

Further, a host (102A-102N) may include functionality to generate, receive, and/or transmit MAC frames. Examples of a host (102A-102N) include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

In one embodiment of the disclosure, there may be various types of hosts (102A-102N) described herein. For example, an intercept host may be mentioned. In one embodiment of the disclosure, an intercept host may be a host whose generated network traffic may be intercepted at a directly connected network element and redirected to a service device (104). The aforementioned network traffic, originating from the intercept host, may be intercepted based on one or more service policies, rules, and/or redirect criteria (discussed below) programmed into the directly connected network element. By way of another example, a non-intercept host may also be mentioned herein. In one embodiment of the disclosure, a non-intercept host may be a host whose generated network traffic is not sought to be intercepted at a directly connected network element. Though not required to be redirected to a service device (104), network traffic originating from a non-intercept host may or may not be inspected by a service device (104). In the case where network traffic from a non-intercept host arrives at and/or is inspected by a service device (104), in one embodiment of the disclosure, the network traffic may be permitted to pass through to a designated destination without transformation or application of a service function (provided by the service device (104)).

In one embodiment of the disclosure, a cloud service (112) may be a platform for the centralized management of and/or consolidation of state information for all or a portion of the network elements (106A-106M) in the system (100). A cloud service (112) may be implemented as one or more physical or virtual device(s), which includes at least one or more processor(s), memory, one or more physical network interface(s) and a data repository. In one embodiment of the disclosure, a cloud service (112) includes executable instructions (stored in a non-transitory computer readable medium), which when executed, enable the cloud service (112) to perform embodiments of the disclosure described herein.

In one embodiment of the disclosure, a cloud service (112) may include a data repository. The data repository may be any type of storage unit and/or device (e.g., a file system, database, collection of tables, or any other storage medium) for storing data. Further, the data repository may include multiple different storage units and/or devices. The multiple storage units and/or devices may or may not be of the same type or located at the same physical site. The data repository may include functionality to store the aforementioned state information for all or a portion of the network elements (106A-106M) and the executable instructions. Other information may be stored in the data repository without departing from the scope of the disclosure.

In one embodiment of the disclosure, a service device (104) may be a physical or virtual computing device that includes functionality to provide a service to network elements (106A-106M) and/or hosts (102A-102N) physically located at any position within the system (100). A service device (104) may include at least one or more processor(s), memory, and two or more physical network interfaces. In one embodiment of the disclosure, a service device (104) may include functionality to process network traffic, redirected to them, in accordance with the configuration of, and the specific service thus provided by, the service device (104) to components of the system (100). Subsequently, a service device (104) may include functionality to filter, mirror, store, forward, drop, transform, and/or perform any other action, or any combination thereof, to redirected network traffic, which is afforded by the configuration and provided service of the service device (104). Examples of a service device (104) include, but are not limited to, a network security device (e.g., a firewall device, a denial of service (DOS) attack scrubber), a network filtering device (e.g., a web content filter), a network data cache (e.g., a web-cache device), and a network load balancing device.

In one embodiment of the disclosure, the L3 fabric (110) may be a set of interconnected network elements or systems, which operatively connect the cloud service(s) (112) to the network elements (106A-106M) of the system (100). The L3 fabric (110) includes functionality to facilitate communications between these aforementioned components. The L3 fabric (110) may include any combination of local area network (LAN) and/or wide area network (WAN) segments, such as the Internet, which may employ any combination of wired and/or wireless connections and communication protocols.

While FIG. 1 shows a configuration of components, other system configurations may be used without departing from the scope of the disclosure. For example, the system (100) may further include one or more virtual machine(s) (not shown), which may execute on any underlying hardware component portrayed in the system (100).

In one embodiment of the disclosure, a VM may be a software based emulation of a computing device. Subsequently, a VM may be assigned all or a portion of the various hardware included in the underlying physical system (e.g., a host (102A-102N), a network element (106A-106M), a service device (104), etc.) that is serving as the VM host. Hosting a VM may include, but is not limited to, providing the VM the hardware resources assigned to the VM, scheduling time for the VM to use various physical hardware resources (e.g., a processor, network resources, etc.), and translating instructions from the VM into instructions that are understood by the underlying physical hardware, operating system, and/or hypervisor of the underlying physical system. In one embodiment of the disclosure, a hypervisor (i.e., a VM monitor) may be computer software that includes the ability to create, execute, and/or, at least in part, manage VMs executing on an underlying physical system. Moreover, a VM may include functionality to generate, receive, and/or transmit MAC frames.

Figure 2:
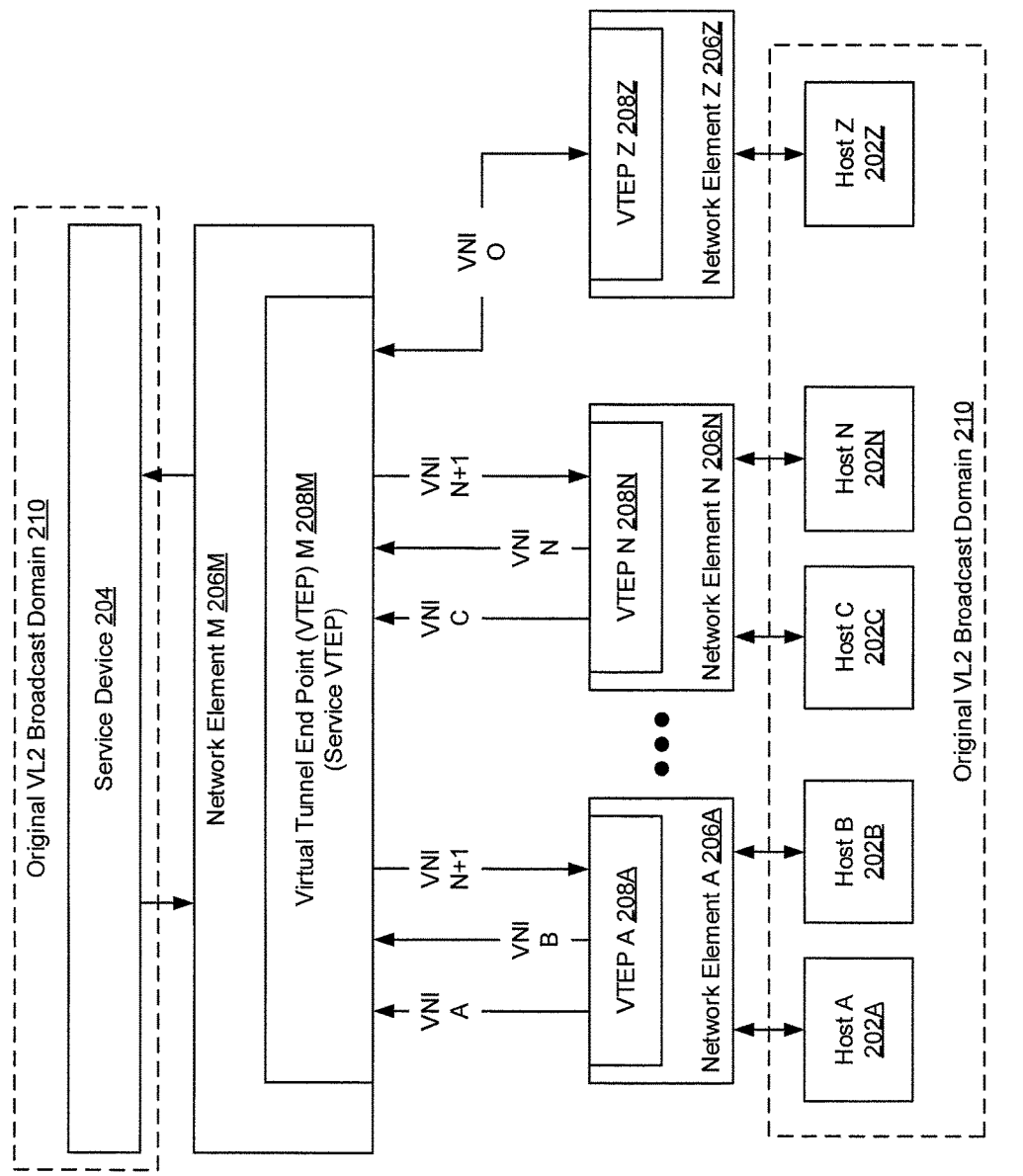
FIG. 2 shows tunneling to and from a service VTEP in accordance with one or more embodiments of the disclosure.

FIG. 2 shows tunneling to and from a service VTEP in accordance with one or more embodiments of the disclosure. Specifically, FIG. 2 shows a non-limiting configuration that includes a service device (204) that is directly connected to a network element M (206M). The configuration further includes a VTEP M (208M), which is a service VTEP (i.e., a VTEP executing on a network element directly connected to a service device). VTEP M (208M) is shown to be executing on network element M (206M). In addition, VTEP M (208M) (and network element M (206M)) are operatively connected to multiple other VTEPs (208A-208Z) (and their respective network elements (206A-206Z)). Each of the aforementioned other network elements (206A-206Z) is directly connected to one or more host(s) (202A-202Z). The configuration additionally illustrates that the hosts (202A-

202Z) and the service device (204) are capable of communicating with one another over an original VL2 broadcast domain (210).

Moreover, in the configuration portrayed in FIG. 2, hosts A-N (202A-202N) are designated as intercept hosts. In one embodiment of the disclosure, an intercept host is a host whose network traffic is intercepted and redirected to a service device for inspection. Inbound and/or outbound network traffic for a host may be intercepted if the network traffic includes information that matches redirect criteria (discussed below) tied to one or more service policies or rules circulated about the network. Other information (outside the data included in MAC and/or VL3 frames) may be used to determine network traffic interception without departing from the scope of the disclosure.

In one embodiment of the disclosure, each intercept host (e.g., 202A-202N) may be assigned (or associated with) a unique dedicated VNI (e.g., VNI A for host A (202A), VNI B for host B (202B), etc.). Each dedicated VNI may be associated with (or correspond to) a respective, unique dedicated VL2 broadcast domain, which may restrict communications to the intercept host (e.g., host A (202A)), via its respective VTEP (e.g., VTEP A (208A)), and the service VTEP (i.e., VTEP M (208M)). In other words, each dedicated VNI (e.g., VNI A, VNI B, VNI C, VNI N) may be associated with a dedicated VL2 broadcast domain, where the dedicated VL2 broadcast domain may be implemented as a tunneling mechanism originating at the VTEP (e.g., VTEP A (208A), VTEP N (208N)) behind which the intercept host resides (that is associated with the dedicated VNI) and the service VTEP (208M), which may be executing on the network element (206M) directly connected to the service device (204). Furthermore, each dedicated VL2 broadcast domain may limit communications in one direction, which includes outbound network traffic from the perspective of the intercept host (202A-202N) or inbound traffic from the perspective of the service VTEP (208M). Subsequently, virtual tunnels that may be instantiated between VTEPs (208A-208N) operatively connected to intercept hosts (202A-202N) and the service VTEP (208M) may originate at a VTEP (208A-208N) behind which the intercept host (202A-202N) resides and terminate at the service VTEP (208M). Moreover, in one embodiment of the disclosure, the only devices associated with (or corresponding to) any given dedicated VNI include the intercept host assigned to the dedicated VNI and the service device (204). For example, host A (202A) and the service device (204) may be the only devices associated with (or corresponding to) dedicated VNI A, whereas host B (202B) and the service device (204) may be the only devices associated with (or corresponding to) dedicated VNI B, and so forth.

In one embodiment of the disclosure, network traffic returning from the service VTEP (208M) to an intercept host (208A-208N) may be assigned to (or associated with) a unique common intercept VNI (e.g., VNI N+1). The common intercept VNI may be associated with (or correspond to) a unique common intercept VL2 broadcast domain, which may restrict communications to the service VTEP (208M) and the one or more intercept host(s) (202A-202N) via their respective VTEPs (208A-208N). Furthermore, the common intercept VL2 broadcast domain may limit communications in one direction, which includes outbound network traffic from the perspective of the service VTEP (208M) or inbound network traffic from the perspective of the one or more intercept host(s) (202A-202N). Therefore, virtual tunnels that may be instantiated between the service VTEP (208M) and other VTEPs (208A-208N) operatively connected to intercept hosts (202A-202N) may originate at the service VTEP (208M) and terminate at a VTEP (208A-208N) behind which an intercept host (202A-202N) resides.

In one embodiment of the disclosure, the implementation of dedicated and common intercept VL2 broadcast domains may be transparent to the set of computing devices (e.g., hosts (202A-202Z), service devices (204), etc.) defined by the original VL2 broadcast domain (210). Subsequently, any network traffic exchanged between a host (202A-202Z) of the original VL2 broadcast domain (210) and a respective, directly connected network element (206A-206Z) must include the original VL2 broadcast domain tag (e.g., VLAN tag) associated with the original VL2 broadcast domain (210). Inclusion of the original VL2 broadcast domain tag in, for example, a MAC frame associates that MAC frame with the original VL2 broadcast domain (210), and further, permits the MAC frame to be transmitted/bridged to and from a host (202A-202Z) of the original VL2 broadcast domain (210). Similarly, in one embodiment of the disclosure, any network traffic exchanged between the service device (204) and its directly connected network element (206M) must include the original VL2 broadcast domain tag associated with the original VL2 broadcast domain (210). Inclusion of the original VL2 broadcast domain tag in, for example, a MAC frame not only associates the MAC frame with the original VL2 broadcast domain (210), but also permits the MAC frame to be transmitted/bridged to and from the service device (204) of the original VL2 broadcast domain (210).

In the configuration portrayed in FIG. 2, host Z (202Z) is designated as a non-intercept host. In one embodiment of the disclosure, a non-intercept host may be a host whose network traffic is not intercepted for inspection by a service device. Inbound and/or outbound network traffic for a host may not be intercepted because information included in the network traffic may not match any redirect criteria tied to one or more service policies or rules circulated about the network. Other information (outside the data included in MAC and/or VL3 frames) may be used to determine that network traffic is not to be intercepted without departing from the scope of the disclosure.

In one embodiment of the disclosure, each non-intercept host (202Z) may not be afforded a unique, dedicated VNI as is granted to an intercept host (202A-202N). Instead, each non-intercept host (202Z) communicates with the service VTEP (208M) by way of an original VNI (e.g., VNI O). The original VNI may be associated with (or correspond to) the original VL2 broadcast domain (210). Furthermore, the original VL2 broadcast domain (210) enables bidirectional communication between VTEPs (208A-208M) (and between hosts (202A-202Z) or the service device (204) and their respective, directly connected network elements (206A-206M)). With respect to communications between VTEPs, virtual tunnels that may be instantiated between the service VTEP (208M) and any other VTEP (208A-208Z) may originate at the service VTEP (208M) (or any one of the other VTEPs (208A-208Z)) and terminate at any one of the other VTEPs (208A-208Z) (or the service VTEP (208M)).

While FIG. 2 shows a configuration of components, other configurations may be used without departing from the scope of the disclosure. For example, the configuration may further include one or more virtual machine(s) (VMs) (not shown), which may execute on the one or more host(s) (202A-202Z) portrayed in the configuration. In one embodiment of the disclosure, similarly to intercept hosts (202A-202N), VMs that are identified as intercept VMs may be assigned (or associated with) a respective, unique dedicated VNI particular to an intercept VM. Outbound network traffic, from the perspective of the intercept VM, may be communicated to the service VTEP (208M) using a dedicated VL2 broadcast domain associated with (or corresponding to) the dedicated VNI for the intercept VM. Furthermore, inbound network traffic, from the perspective of the intercept VM, may be communicated from the service VTEP (208M) using the above-mentioned common intercept VL2 broadcast domain associated with (or corresponding to) the common intercept VNI for all intercept hosts and/or VMs.

Figure 5:
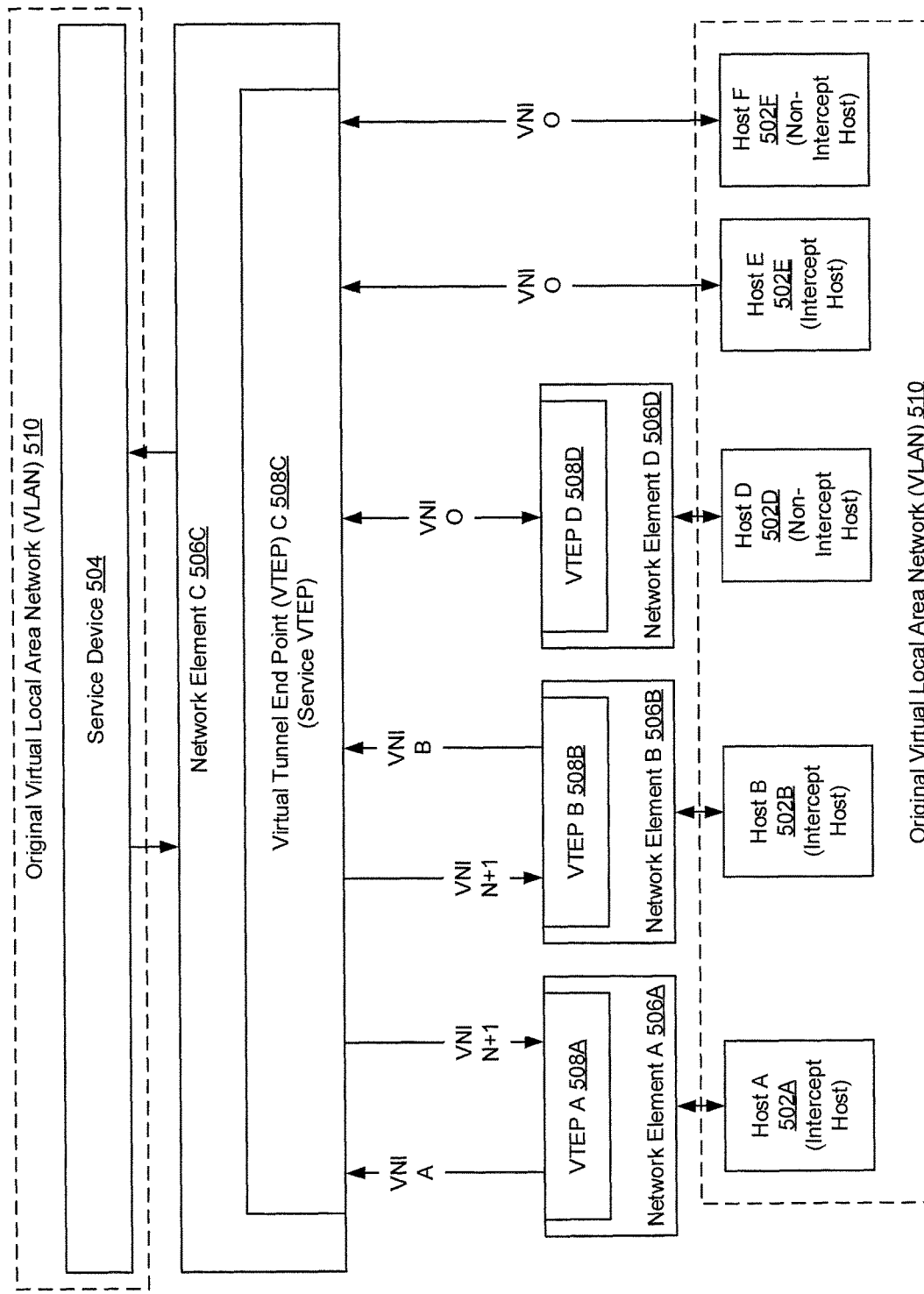
FIG. 5 shows an example system in accordance with one or more embodiments of the disclosure.

By way of another example, the configuration may further include one or more directly connected host(s) (see e.g., FIG. 5, 502E and 502F). In one embodiment of the disclosure, a directly connected host may be a host that is directly connected to the network element (206M) on which the service VTEP (208M) is executing. Further, in one embodiment of the disclosure, a directly connected host may be an intercept host. In another embodiment of the disclosure, a directly connected host may be a non-intercept host. In either embodiment, network traffic exchanged (in both directions) between these directly connected hosts and the service VTEP (208M) may be communicated using the original VNI, and thus, associated with the original VL2 broadcast domain (210).

Figure 3:
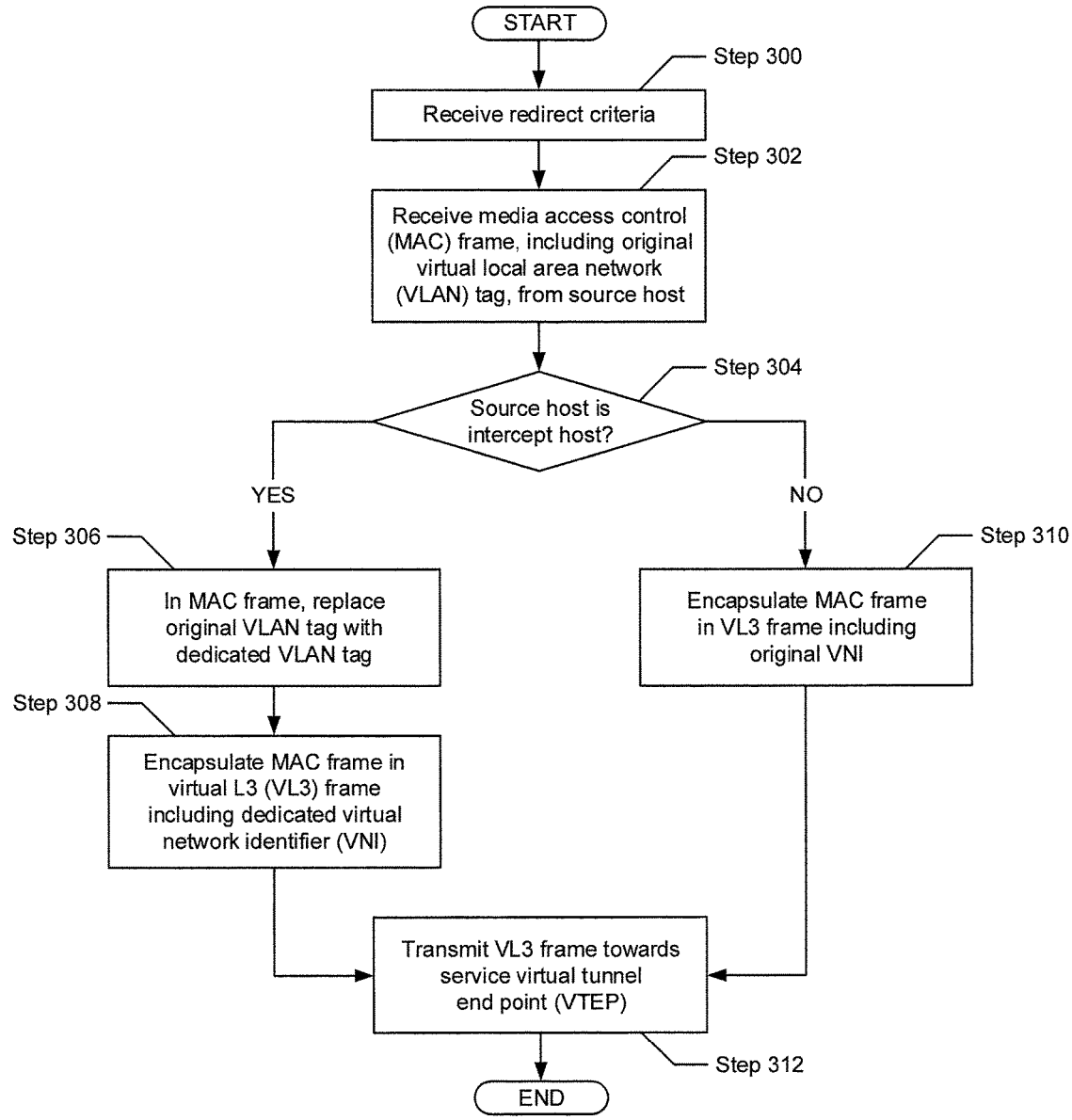
FIG. 3 shows a flowchart describing a method for transmitting MAC frames to a service VTEP in accordance with one or more embodiments of the disclosure.

FIG. 3 shows a flowchart describing a method for transmitting MAC frames to a service VTEP in accordance with one or more embodiments of the disclosure. While the various steps in the flowchart is presented and described sequentially, one of ordinary skill in the relevant art will appreciate that some or all of the steps may be executed in different orders, may be combined or omitted, and some or all steps may be executed in parallel. In one embodiment of the disclosure, the steps shown in FIG. 3 may be performed in parallel with any other steps shown in FIGS. 3-4F without departing from the scope of the disclosure.

Turning to FIG. 3, in Step 300, redirect criteria pertaining to one or more service policies or rules are received. In one embodiment of the disclosure, the redirect criteria may be received by any VTEP, including a service VTEP (described above), and/or any network element in the network. Further, redirect criteria may include requirements (to be matched) in order to steer or redirect network traffic towards a service device. Redirect criteria may include, but are not limited to, matching requirements tied to: (i) a specific network element (i.e., a service policy may require that any network traffic originating from or destined to a specific network element must be redirected to service device for inspection first); (ii) a specific network interface on a network element (i.e., a service policy may require that any inbound and/or outbound network traffic traversing a specific network interface on a network element must be redirected to a service device for inspection first); (iii) a specific host or virtual machine (i.e., a service policy may require that any network traffic originating from or destined to a specific host or virtual machine must be redirected to a service device for inspection first); (iv) a specific source IP or MAC address and destination IP or MAC address pair (i.e., a service policy may require that any network traffic including a specific source IP/MAC address and a specific destination IP/MAC address must be redirected to a service device for inspection first); and (v) a specific virtual local area network (VLAN) and a specific IP/MAC address pair (i.e., a service policy may require that any network traffic including a specific VLAN tag (or VNI) and a specific IP/MAC address (associated with either a source or a destination) must be redirected to a service device for inspection first). Embodiments of the disclosure are not limited to the above-mentioned examples.

In Step 302, a MAC frame is subsequently received. In one embodiment of the disclosure, the MAC frame may be generated and transmitted by a source host. Further, in one embodiment of the disclosure, the MAC frame may include an original VLAN tag. The original VLAN tag may be an Institute of Electrical and Electronics Engineers (IEEE) 802.1Q tag. Embodiments of the disclosure are not limited to any particular version or implementation of VLAN tagging. Moreover, in general, a VLAN tag includes information, which identifies the VLAN to which a MAC frame is associated. Thus, in one embodiment of the disclosure, the original VLAN tag may identify that the MAC frame (received in Step 300) is associated with an original VLAN (or VL2 broadcast domain). The VLAN tag may include additional information without departing from the scope of the disclosure. In another embodiment of the disclosure, the MAC frame may not include a VLAN tag. In such an embodiment, the untagged MAC frame may be associated with a default VLAN (which may be the original VLAN or any other VLAN). The association may be predetermined based on the current configuration of the network element that which received the MAC frame.

In Step 304, a determination is made as to whether the source host (from which the MAC frame originates) is an intercept host. As mentioned above, in one embodiment of the disclosure, an intercept host refers to a host whose network traffic, per service policies disseminated throughout the network, is to be intercepted and redirected towards a service device for inspection. Subsequently, if it is determined that the source host is an intercept host (i.e., the MAC frame meets the redirect criteria received in Step 300), the process proceeds to Step 306. On the other hand, if it is determined that the source host is not an intercept host (or a non-intercept host) (i.e., the MAC frame fails to meet the redirect criteria), the process proceeds to Step 310.

In Step 306, after determining (in Step 304) that the source host is an intercept host, the original VLAN tag in the MAC frame (received in Step 302) is replaced with a dedicated VLAN tag. In one embodiment of the disclosure, the dedicated VLAN tag may be a distinct VLAN tag assigned to (or associated with) the source host.

In Step 308, after replacing the original VLAN tag with the dedicated VLAN tag, the MAC frame is encapsulated in a VL3 frame. In one embodiment of the disclosure, the VL3 frame may include a dedicated VNI. The dedicated VNI may correlate to the dedicated VLAN tag included in the MAC frame.

In Step 310, after determining (in Step 304) that the source host is a non-intercept host, the MAC frame is encapsulated in a VL3 frame. In one embodiment of the disclosure, the VL3 frame may include an original VNI. The original VNI may correlate to the original VLAN tag included in the MAC frame.

In Step 312, after encapsulating the MAC frame (in either Step 308 or Step 310), the VL3 frame is transmitted towards a service VTEP. In one embodiment of the disclosure, prior to the actual transmission of the VL3 frame, a virtual tunnel may be instantiated first, which originates at a source VTEP (i.e., a VTEP executing on a network element that is directly connected to the source host) and terminates at the service VTEP (i.e., a VTEP executing on another network element that is directly connected to the service device).

FIGS. 4A-4F show flowcharts describing a method for handling MAC frames by a service VTEP in accordance with one or more embodiments of the disclosure. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the disclosure, the steps shown in FIGS. 4A-4F may be performed with any other steps shown in FIGS. 3-4F without departing from the scope of the disclosure.

Figure 4A:
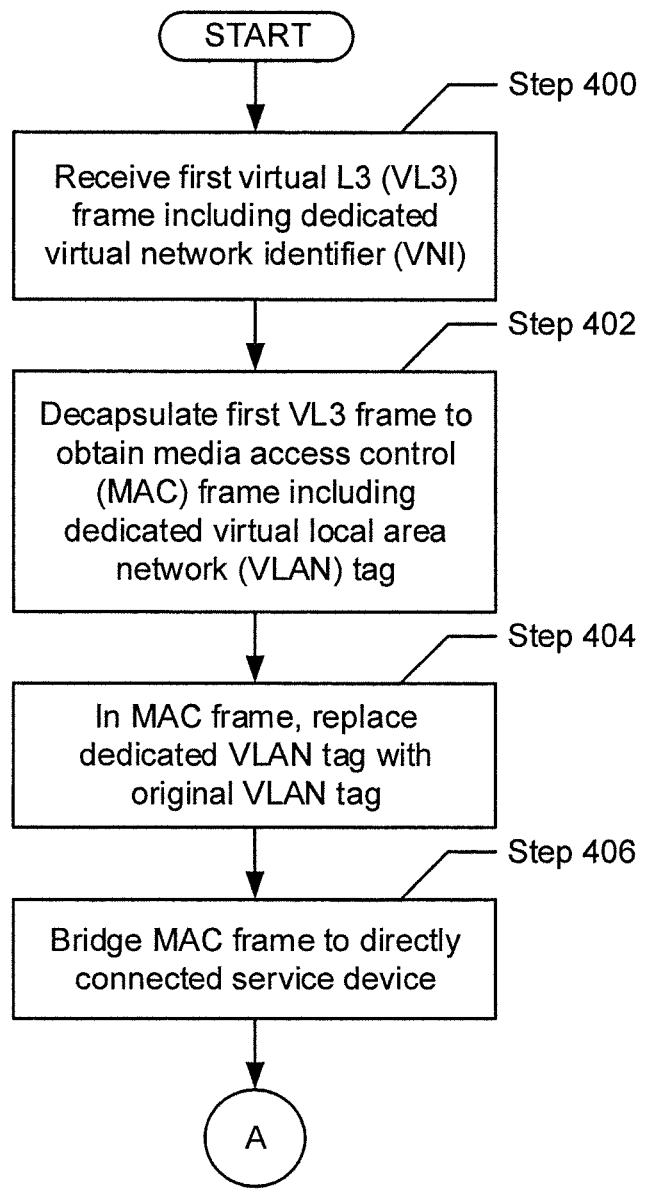
FIGS. 4A-4F show flowcharts describing a method for handling MAC frames by a service VTEP in accordance with one or more embodiments of the disclosure.

Turning to FIG. 4A, in Step 400, a first VL3 frame is received. In one embodiment of the disclosure, the first VL3 frame may be received by a service VTEP and transmitted towards the service VTEP by a remote VTEP executing on a network element directly connected to an intercept host. Further, the first VL3 frame may include a dedicated VNI. The dedicated VNI may be a distinct VNI uniquely assigned to (or associated with) the aforementioned intercept host.

In Step 402, the first VL3 frame is decapsulated to obtain a MAC frame. In one embodiment of the disclosure, decapsulation refers to the removal of L3 header information from the VL3 frame to expose the MAC frame enclosed therein. Further, the MAC frame may include a dedicated VLAN tag. The dedicated VLAN tag may be associated with (or correspond to) the dedicated VNI included in the first VL3 frame (received in Step 400).

In Step 404, the dedicated VLAN tag in the MAC frame is replaced with an original VLAN tag. In one embodiment of the disclosure, as mentioned above, the implementing of the dedicated (and common intercept) VLANs are transparent to the various hosts and service devices in the network. Consequently, any MAC frames: (i) that may be communicated to the hosts and/or service devices; and (ii) that include VLAN tags associated with a VLAN other than the original VLAN, need to be rewritten with the original VLAN tag associated with the original VLAN.

In Step 406, the MAC frame (rewritten in Step 404) is bridged to a service device. In one embodiment of the disclosure, the service device is directly connected to a network element on which the service VTEP is executing. From here, the process proceeds to Step 420 (see e.g., FIG. 4B).

Figure 4B:
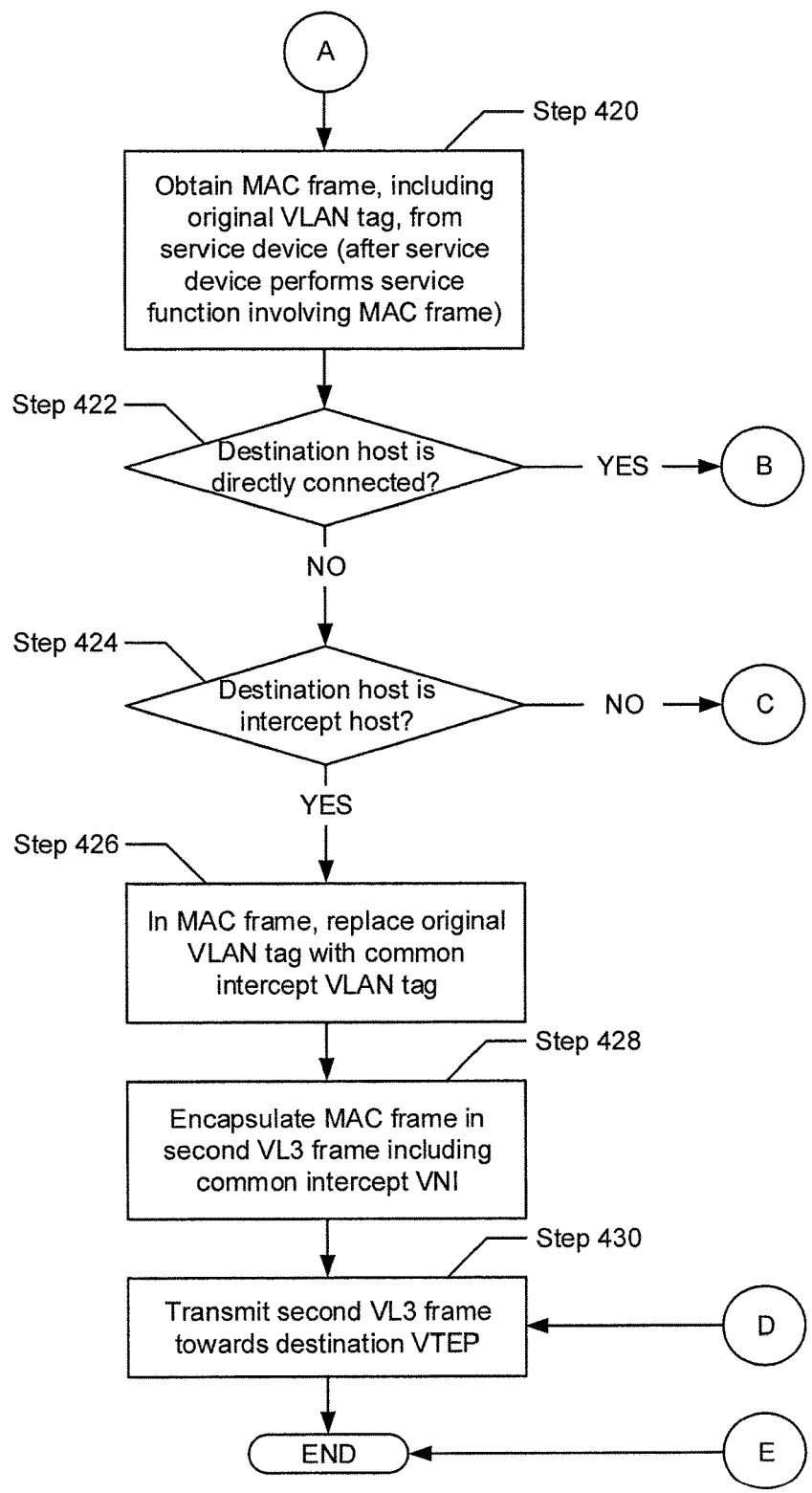

Turning to FIG. 4B, in Step 420, the MAC frame (bridged to the service device in Steps 406, 460 (discussed below), or 482 (discussed below)) is obtained from the service device. In one embodiment of the disclosure, the MAC frame may be obtained back from the service device after the service device performs one or more service function(s) involving at least the MAC frame. By way of non-limiting examples, the service functions performed by the service device may include filtering, mirroring, storing, forwarding, dropping, transforming, and/or performing any other action, or any combination thereof, to redirected network traffic (i.e., the MAC frame), which may be afforded by the configuration and provided services of the service device. In one embodiment of the disclosure, the MAC frame (obtained back from the service device) retains the original VLAN tag therein.

In Step 422, a first determination is made as to whether the destination host (i.e., the destination for the MAC frame) is a directly connected host. In one embodiment of the disclosure, a directly connected host refers to a host that is directly connected to the network element on which the service VTEP is executing. If it is determined that the destination host is a directly connected host, the process proceeds to Step 440 (see e.g., FIG. 4C). On the other hand, if it is determined that the destination host is not a directly connected host, the process proceeds to Step 424.

In Step 424, after determining (in Step 422) that the destination host is not a directly connected host, a second determination is made as to whether the destination host is an intercept host. In one embodiment of the disclosure, an intercept host may be a host whose network traffic is intercepted and redirected to a service device in accordance with service policies, rules, and/or redirect criteria. If it is determined that the destination host is an intercept host, the process proceeds to Step 426. On the other hand, if it is determined that the destination host is not an intercept host (or a non-intercept host), the process proceeds to Step 442 (see e.g., FIG. 4D).

In Step 426, after determining (in Step 424) that the destination host is an intercept host, the original VLAN tag in the MAC frame (obtained in Step 420) is replaced with a common intercept VLAN tag. In one embodiment of the disclosure, the common intercept VLAN tag may be a unique VLAN tag for outbound network traffic directed to any and all intercept hosts in a zone. In one embodiment of the disclosure, a zone may be a set of computing devices (e.g., hosts, virtual machines, etc.) that are assigned a same trust level. In other embodiments of the disclosure, a zone may be a set of computing devices that share any other common characteristic.

In Step 428, after the MAC frame is rewritten to replace the original VLAN tag with the common intercept VLAN tag (in Step 426), the MAC frame is encapsulated in a second VL3 frame. In one embodiment of the disclosure, encapsulation refers to appending L3 header information to the MAC frame, thus yielding a VL3 frame, such as, for example, a VXLAN frame. Further, the second VL3 frame may include a common intercept VNI. The common intercept VNI may be associated with (or correspond to) the common intercept VLAN tag included in the MAC frame.

In Step 430, the second VL3 frame (generated/obtained in Step 428) is transmitted. In one embodiment of the disclosure, the second VL3 frame is transmitted towards a destination VTEP. Specifically, a virtual tunnel may be instantiated to enable the traversal of the second VL3 frame, where the virtual tunnel may originate at the service VTEP and terminate at the destination VTEP. Further, the destination VTEP may be a VTEP executing on a network element that is directly connected to the destination for the MAC frame (i.e., an intercept host). At this point, the process ends.

Figure 4C:
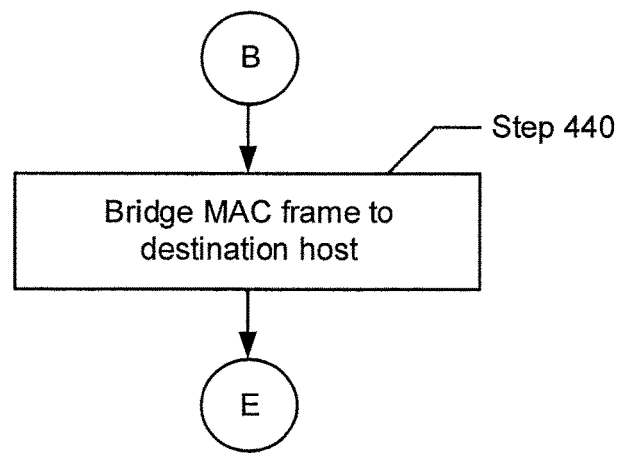

Turning to FIG. 4C, in Step 440, after determining (in Step 422, see e.g., FIG. 4B) that the destination host is a directly connected host, the MAC frame (obtained back from the service device in Step 420) is bridged to the destination host. In one embodiment of the disclosure, because the destination host communicates using the original VLAN, the original VLAN tag included in the MAC frame is retained before the MAC frame is bridged to the destination host. After the MAC frame is bridged, the process ends.

Figure 4D:
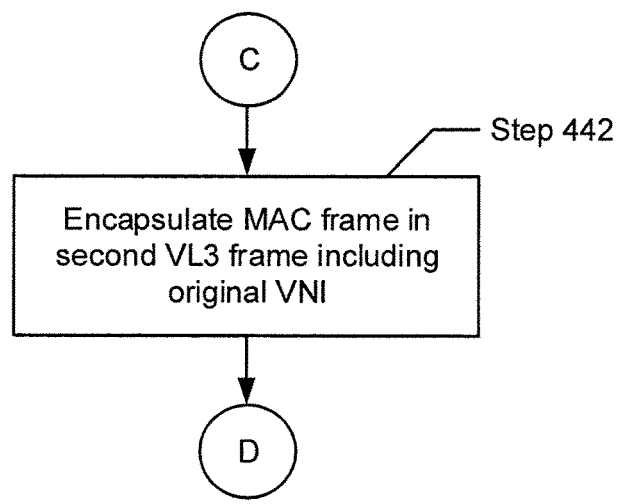

Turning to FIG. 4D, in Step 442, after determining (in Step 424, see e.g., FIG. 4B) that the destination host is not an intercept host (i.e., a non-intercept host), the MAC frame (obtained back from the service device in Step 420) is encapsulated in a second VL3 frame. In one embodiment of the disclosure, the second VL3 frame may include the original VNI. The original VNI may be associated with (or correspond to) the original VLAN, and the original VLAN tag included in the MAC frame. After the MAC frame is encapsulated, the process proceeds to Step 430 (see e.g., FIG. 4B).

Figure 4E:
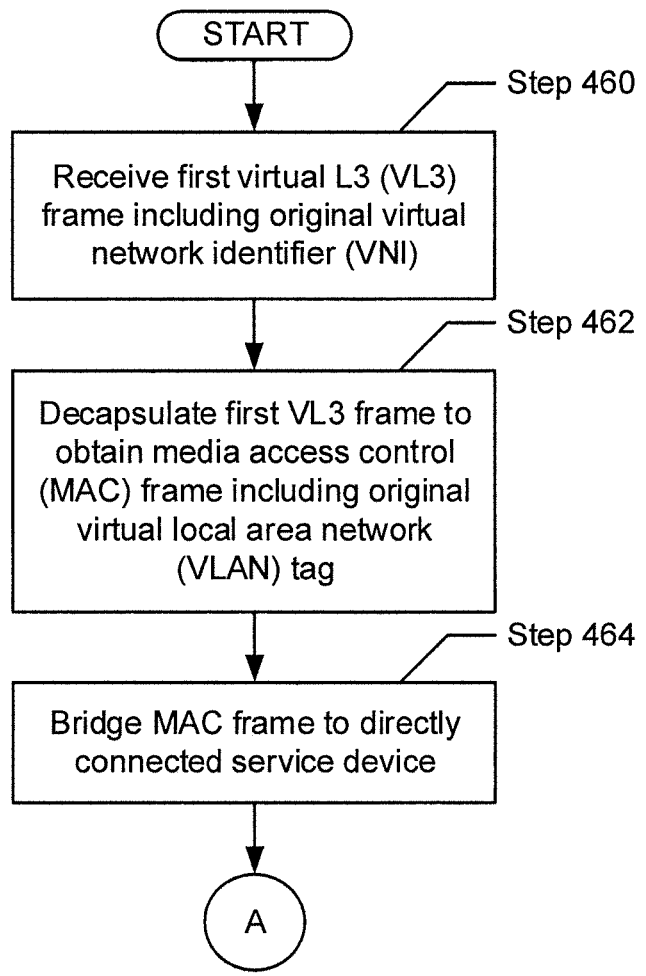

FIG. 4E shows a flowchart describing an alternative handling of MAC frames by the service VTEP in accordance with one or more embodiments of the disclosure. More specifically, FIG. 4E describes the handling of MAC frames originating from non-intercept hosts (i.e., hosts whose network traffic are not intercepted for inspection based on disseminated service policies, rules, and/or redirect criteria).

With this in mind, in Step 460, a VL3 frame is received (by the service VTEP). In one embodiment of the disclosure, the VL3 frame may include an original VNI. The original VNI may be associated with (or correspond to) the original VLAN. In Step 462, the VL3 frame is decapsulated to obtain a MAC frame. In one embodiment of the disclosure, the MAC frame may include an original VLAN tag. The original VLAN tag may be associated with (or correspond to) the original VNI included in the VL3 frame, and thus, also the original VLAN. In Step 464, because the MAC frame already retains the original VLAN tag, which is necessary for bridging the MAC frame to the service device, the MAC frame is subsequently bridged to the service device. The service device may be directly connected to the network element on which the service VTEP is executing. From there, the process proceeds to Step 420 (see e.g., FIG. 4B).

Figure 4F:
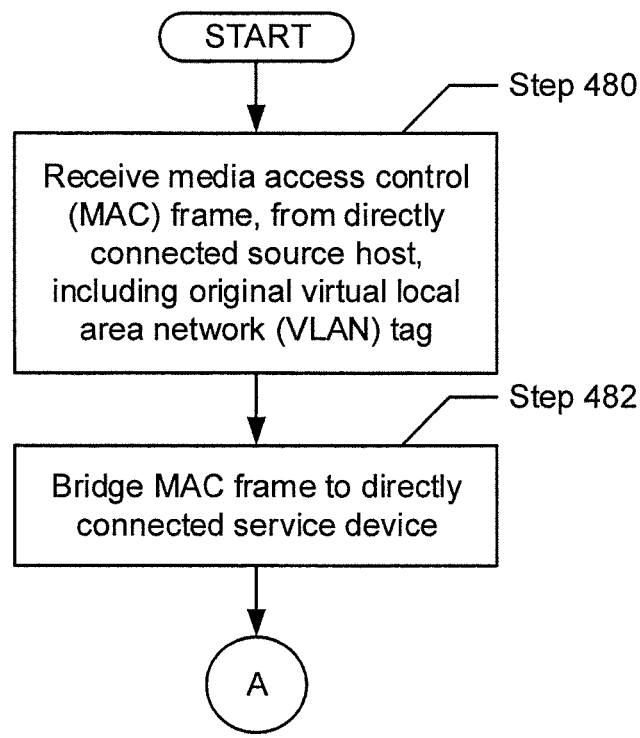

FIG. 4F shows a flowchart describing an alternative handling of MAC frames by the service VTEP in accordance with one or more embodiments of the disclosure. More specifically, FIG. 4F describes the handling of MAC frames originating from directly connected source hosts (i.e., hosts that are directly connected to the network element on which the service VTEP is executing).

With this in mind, in Step 480, a MAC frame is received (by the service VTEP). In one embodiment of the disclosure, the MAC frame may be bridged over by a source host, which may be an intercept host or a non-intercept host. In either case, because the source host is directly connected to the network element on which the service VTEP is executing, the MAC frame is bridged over rather than encapsulated into a VL3 frame prior to being sent to the service VTEP. Further, in one embodiment of the disclosure, the MAC frame may include an original VLAN tag because the source host is (as all hosts in the network are) included in the set of computing devices defined by the original VLAN.

In Step 482, because the MAC frame already retains the original VLAN tag, which is necessary for bridging the MAC frame to the service device, the service VTEP proceeds in bridging the MAC frame to the service device. The service device may be directly connected to the network element on which the service VTEP is executing. From here, the process proceeds to Step 420 (see e.g., FIG. 4B).

FIG. 5 shows an example system in accordance with one or more embodiments of the disclosure. The following examples, presented in conjunction with components shown in FIG. 5, are for explanatory purposes only and not intended to limit the scope of the disclosure.

For context surrounding each of the following examples, the example system shown in FIG. 5 includes a service device (504), which is directly connected to network element C (506C) on which VTEP C (508C) is executing. VTEP C (508C) is designated a service VTEP because it is executing on a network element (506C) that is directly connected to a service device (504). The example system also includes three other network elements (506A, 506B, 506D). A respective VTEP (508A, 508B, 508D) is executing on each of these other network elements (506A, 506B, 506D). Directly connected to each of these network elements (506A, 506B, 506D) is also a host (502A, 502B, 502D). In addition, there are two hosts (502E, 502F) that are directly connected to network element C (506C). Of the presented hosts, hosts A, B, and E (502A, 502B, 502E) are designated as intercept hosts (i.e., their network traffic, in accordance with service policies or rules, are to be intercepted and redirected to the service device (510) for inspection). The remaining hosts D and F (502D, 502F) are designated as non-intercept hosts (i.e., per service policies or rules, their network traffic requires not be intercepted for inspection by the service device). Furthermore, each of the hosts (502A-502F) and the service device (504) are not aware of the additional VNIs and/or VLANs (e.g., VNI A, VNI N+1, etc.) introduced by embodiments of the disclosure. Instead, the hosts (502A-502F) and the service device (504) communicate with one another using an original VNI (i.e., VNI O) associated with (or corresponding to) an original VLAN (510).

Example 1

For this first example, consider a scenario whereby host A (502A) generates network traffic (i.e., a MAC frame) that designates host B (502B) as the destination. In accordance with embodiments of the disclosure, the MAC frame generated by host A (502A) includes an original VLAN tag associated with (or corresponding to) the original VLAN (510) by which host A (502A) communicates with the other hosts (502B-502F) and the service device (504). After generating the MAC frame, host A (502A) bridges the MAC frame to its directly connected network element—network element A (506A). At network element A (506A), VTEP A (508A) is executing and has, at a prior time, received redirect criteria circulated about the network. The redirect criteria tie to one or more service policies/rules, which identify requirements for network traffic interception and redirection towards the service device (504). While being processed by VTEP A (508A), it is determined that the MAC frame includes information that matches at least one of the requirements specified in the redirect criteria. In response to this determination, VTEP A (508A) intercepts the MAC frame and prepares to redirect the MAC frame towards the service device (504). Specifically, VTEP A (508A) first replaces the original VLAN tag in the MAC frame with a dedicated VLAN tag (i.e., VLAN A tag) associated with the dedicated VLAN (i.e., VLAN A) unique to host A (502A). Next, VTEP A (508A) encapsulates the MAC frame in a VXLAN frame, where the VXLAN frame includes a dedicated VNI (i.e., VNI A) associated with (or mapped to) the dedicated VLAN (i.e., VLAN A) unique to host A (502A). VTEP A (508A) subsequently instantiates a virtual tunnel originating at VTEP A (508A) and terminating at the service VTEP (i.e., VTEP C (508C)) and proceeds to transmit the generated/obtained VXLAN frame towards the service VTEP (508C).

Upon arriving at the service VTEP (508C), the VXLAN frame is decapsulated to obtain the MAC frame enclosed therein. Because the service device (504) is the only other entity, other than host A (502A), associated with the dedicated VNI (i.e., VNI A), and thus the dedicated VLAN (i.e., VLAN A), the service VTEP (508C) determines that the MAC frame needs to be bridged over to the service device (504), which is directly connected to the network element (506C) on which the service VTEP (508C) is executing. In response to this determination, the service VTEP (508C) first replaces the dedicated VLAN tag (i.e., VLAN A tag) in the MAC frame with the original VLAN tag, and then, proceeds to bridge the MAC frame to the service device (504).

At the service device (504), based on the configuration programmed into the service device (504) and the service policies/rules in place, the MAC frame is subjected to one or more service function(s) performed by the service device (504). After performing the service function(s), the service device (504) bridges the MAC frame back to the service VTEP (508C). At this point, the MAC frame retains the original VLAN tag because the service device (504) is only aware of communications using the original VLAN (510).

Back at the service VTEP (508C), the service VTEP (508C) analyzes the MAC frame (i.e., analyzes the L2 header information therein) to: (i) make a first determination as to whether the destination for the MAC frame is a directly connected host; and/or (ii) make a second determination as to whether the destination for the MAC frame is an intercept host or a non-intercept host. As host B (502B) is the destination for the MAC frame, it is eventually determined that host B (502B) is not a directly connected host but is an intercept host. Further, based on the determination that host B (502B) is an intercept host, the service VTEP (508C) prepares the MAC frame for transmission towards host B (502B). Specifically, the service VTEP (508C) first replaces the original VLAN tag in the MAC frame with a common intercept VLAN tag (i.e., VLAN N+1 tag). The common intercept VLAN tag is associated with a common intercept VLAN (i.e., VLAN N+1) that facilitates all outbound communications from the service VTEP (508C) to any VTEP (508A, 508B) corresponding to an intercept host (502A, 502B). After replacing the VLAN tag, the service VTEP (508C) encapsulates the MAC frame in a VXLAN frame, which includes a common intercept VNI (i.e., VNI N+1) associated with (or mapped to) the common intercept VLAN tag, and thus, the common intercept VLAN. After the VXLAN frame is generated/obtained, the service VTEP (508C) instantiates a virtual tunnel originating at the service VTEP (508C) and terminating at the VTEP B (508B) and proceeds to transmit the generated/obtained VXLAN frame towards VTEP B (508B). Furthermore, in one embodiment of the disclosure, because multiple intercept hosts (i.e., host A (502A), host B (502B), and host E (502E)) may be associated with (or correspond to) the common intercept VNI (i.e., VNI N+1), additional steps may be performed in order to ensure that the MAC frame does not get flooded to all VTEPs associated with the common intercept VNI and/or VLAN. These additional steps may entail the simulated MAC learning of all the intercept hosts on the common intercept VNI at each of their respective VTEPs. In one embodiment of the disclosure, simulated MAC learning refers to the learning of MAC addresses for all the intercept hosts via sharing of information between a cloud service (see e.g., FIG. 1) and each respective network element (e.g., network element A (506A), network element B (506B), and network element C (506C)) on which the respective VTEP for each intercept host resides.

Upon arriving at VTEP B (508B), the VXLAN frame is decapsulated to obtain the MAC frame enclosed therein. From here, VTEP B (508B) analyzes the MAC frame (i.e., analyzes the L2 header information therein) to determine that the destination for the MAC frame is host B (502B), which is directly connected to the network element (506B) on which VTEP B (508B) is executing. Based on this determination, VTEP B (508B) first replaces the common intercept VLAN tag (i.e., VLAN N+1 tag) in the MAC frame with the original VLAN tag, and subsequently, proceeds to bridge the MAC frame to host B (502B).

Example 2

For this second example, consider a scenario whereby host A (502A) generates network traffic (i.e., a MAC frame) that designates host D (502D) as the destination. In accordance with embodiments of the disclosure, the MAC frame generated by host A (502A) includes an original VLAN tag associated with (or corresponding to) the original VLAN (510) by which host A (502A) communicates with the other hosts (502B-502F) and the service device (504). After generating the MAC frame, host A (502A) bridges the MAC frame to its directly connected network element—network element A (506A). At network element A (506A), VTEP A (508A) is executing and has, at a prior time, received redirect criteria circulated about the network. The redirect criteria tie to one or more service policies/rules, which identify requirements for network traffic interception and redirection towards the service device (504). While being processed by VTEP A (508A), it is determined that the MAC frame includes information that matches at least one of the requirements specified in the redirect criteria. In response to this determination, VTEP A (508A) intercepts the MAC frame and prepares to redirect the MAC frame towards the service device (504). Specifically, VTEP A (508A) first replaces the original VLAN tag in the MAC frame with a dedicated VLAN tag (i.e., VLAN A tag) associated with the dedicated VLAN (i.e., VLAN A) unique to host A (502A). Next, VTEP A (508A) encapsulates the MAC frame in a VXLAN frame, where the VXLAN frame includes a dedicated VNI (i.e., VNI A) associated with (or mapped to) the dedicated VLAN (i.e., VLAN A) unique to host A (502A). VTEP A (508A) subsequently instantiates a virtual tunnel originating at VTEP A (508A) and terminating at the service VTEP (i.e., VTEP C (508C)) and proceeds to transmit the generated/obtained VXLAN frame towards the service VTEP (508C).

Upon arriving at the service VTEP (508C), the VXLAN frame is decapsulated to obtain the MAC frame enclosed therein. Because the service device (504) is the only other entity, other than host A (502A), associated with the dedicated VNI (i.e., VNI A), and thus the dedicated VLAN (i.e., VLAN A), the service VTEP (508C) determines that the MAC frame needs to be bridged over to the service device (504), which is directly connected to the network element (506C) on which the service VTEP (508C) is executing. In response to this determination, the service VTEP (508C) first replaces the dedicated VLAN tag (i.e., VLAN A tag) in the MAC frame with the original VLAN tag, and then, proceeds to bridge the MAC frame to the service device (504).

At the service device (504), based on the configuration programmed into the service device (504) and the service policies/rules in place, the MAC frame is subjected to one or more service function(s) performed by the service device (504). After performing the service function(s), the service device (504) bridges the MAC frame back to the service VTEP (508C). At this point, the MAC frame retains the original VLAN tag because the service device (504) is only aware of communications using the original VLAN (510).

Back at the service VTEP (508C), the service VTEP (508C) analyzes the MAC frame (i.e., analyzes the L2 header information therein) to: (i) make a first determination as to whether the destination for the MAC frame is a directly connected host; and/or (ii) make a second determination as to whether the destination for the MAC frame is an intercept host or a non-intercept host. As host D (502D) is the destination for the MAC frame, it is eventually determined that host D (502D) is not a directly connected host but is a non-intercept host. Further, based on the determination that host D (502D) is a non-intercept host, the service VTEP (508C) prepares the MAC frame for transmission towards host D (502D). Specifically, the service VTEP (508C) retains the original VLAN tag in the MAC frame. Subsequently, the service VTEP (508C) encapsulates the MAC frame in a VXLAN frame, which includes an original VNI (i.e., VNI O) associated with (or mapped to) the original VLAN tag, and thus, the original VLAN (510). After the VXLAN frame is generated/obtained, the service VTEP (508C) instantiates a virtual tunnel originating at the service VTEP (508C) and terminating at the VTEP D (508D) and proceeds to transmit the generated/obtained VXLAN frame towards VTEP D (508D).

Upon arriving at VTEP D (508D), the VXLAN frame is decapsulated to obtain the MAC frame enclosed therein. From here, VTEP D (508D) analyzes the MAC frame (i.e., analyzes the L2 header information therein) to determine that the destination for the MAC frame is host D (502D), which is directly connected to the network element (506D) on which VTEP D (508D) is executing. Based on this determination, VTEP D (508D) retains the original VLAN tag (i.e., VLAN O tag) in the MAC frame, and subsequently, proceeds to bridge the MAC frame to host D (502D).

Example 3

For this third example, consider a scenario whereby host D (502D) generates network traffic (i.e., a MAC frame) that designates host B (502B) as the destination. In accordance with embodiments of the disclosure, the MAC frame generated by host D (502D) includes an original VLAN tag associated with (or corresponding to) the original VLAN (510) by which host D (502D) communicates with the other hosts (502A-502B,502E, and 502F) and the service device (504). After generating the MAC frame, host D (502D) bridges the MAC frame to its directly connected network element—network element D (506D). At network element D (506D), VTEP D (508D) is executing and has, at a prior time, received redirect criteria circulated about the network. The redirect criteria tie to one or more service policies/rules, which identify requirements for network traffic interception and redirection towards the service device (504). While being processed by VTEP D (508D), it is determined that the MAC frame does not include information that matches any of the requirements specified in the redirect criteria. In response to this determination, VTEP D (508D) performs a lookup of a forwarding information base (FIB) using the destination MAC address specified in the MAC frame to further determine that host B (502B) (associated with the destination MAC address) is connected to the service VTEP (508C). The FIB may identify host B (502B) as being connected to the service VTEP (508C) because prior network traffic from host B (502B) may have been intercepted and subsequently forwarded to the service device (504), which on return from the service device (504) on the original VLAN (510), would have caused host B (502B) to have been learned in the original VLAN (510) on the service VTEP (508C). Hereafter, VTEP D (508D) encapsulates the MAC frame in a VXLAN frame, where the VXLAN frame includes an original VNI (i.e., VNI O) associated with (or mapped to) the original VLAN (510). VTEP D (508D) subsequently instantiates a virtual tunnel originating at VTEP D (508D) and terminating at the service VTEP (i.e., VTEP C (508C)) and proceeds to transmit the generated/obtained VXLAN frame towards the service VTEP (508C).

Upon arriving at the service VTEP (508C), the VXLAN frame is decapsulated to obtain the MAC frame enclosed therein. Subsequently, the service VTEP (508C) performs a lookup using at least a portion of the MAC frame to determine that the MAC frame is to be bridged to the service device (504). This determination may be due to the learning of the MAC address for host B (502B) on the network interface of network element C (508C) coupled to the service device (504) when network traffic from host B (502B) had been intercepted earlier. Following this determination, the service VTEP (508C) retains the original VLAN tag (i.e., VLAN O tag) in the MAC frame, and then, proceeds to bridge the MAC frame to the service device (504).

At the service device (504), based on the configuration programmed into the service device (504) and the service policies/rules in place, the MAC frame is subjected to one or more service function(s) performed by the service device (504). After performing the service function(s), the service device (504) bridges the MAC frame back to the service VTEP (508C). At this point, the MAC frame retains the original VLAN tag because the service device (504) is only aware of communications using the original VLAN (510).

Back at the service VTEP (508C), the service VTEP (508C) analyzes the MAC frame (i.e., analyzes the L2 header information therein) to: (i) make a first determination as to whether the destination for the MAC frame is a directly connected host; and/or (ii) make a second determination as to whether the destination for the MAC frame is an intercept host or a non-intercept host. As host B (502B) is the destination for the MAC frame, it is eventually determined that host B (502B) is not a directly connected host but is an intercept host. Further, based on the determination that host B (502B) is an intercept host, the service VTEP (508C) prepares the MAC frame for transmission towards host B (502B). Specifically, the service VTEP (508C) first replaces the original VLAN tag in the MAC frame with a common intercept VLAN tag (i.e., VLAN N+1 tag). The common intercept VLAN tag is associated with a common intercept VLAN (i.e., VLAN N+1) that facilitates all outbound communications from the service VTEP (508C) to any VTEP (508A, 508B) corresponding to an intercept host (502A, 502B). After replacing the VLAN tag, the service VTEP (508C) encapsulates the MAC frame in a VXLAN frame, which includes a common intercept VNI (i.e., VNI N+1) associated with (or mapped to) the common intercept VLAN tag, and thus, the common intercept VLAN. After the VXLAN frame is generated/obtained, the service VTEP (508C) instantiates a virtual tunnel originating at the service VTEP (508C) and terminating at the VTEP B (508B) and proceeds to transmit the generated/obtained VXLAN frame towards VTEP B (508B).

Upon arriving at VTEP B (508B), the VXLAN frame is decapsulated to obtain the MAC frame enclosed therein. From here, VTEP B (508B) analyzes the MAC frame (i.e., analyzes the L2 header information therein) to determine that the destination for the MAC frame is host B (502B), which is directly connected to the network element (506B) on which VTEP B (508B) is executing. Based on this determination, VTEP B (508B) first replaces the common intercept VLAN tag (i.e., VLAN N+1 tag) in the MAC frame with the original VLAN tag, and subsequently, proceeds to bridge the MAC frame to host B (502B).

Example 4

For this fourth example, consider a scenario whereby host A (502A) generates network traffic (i.e., a MAC frame) that designates host E (502E) as the destination. In accordance with embodiments of the disclosure, the MAC frame generated by host A (502A) includes an original VLAN tag associated with (or corresponding to) the original VLAN (510) by which host A (502A) communicates with the other hosts (502B-502F) and the service device (504). After generating the MAC frame, host A (502A) bridges the MAC frame to its directly connected network element—network element A (506A). At network element A (506A), VTEP A (508A) is executing and has, at a prior time, received redirect criteria circulated about the network. The redirect criteria tie to one or more service policies/rules, which identify requirements for network traffic interception and redirection towards the service device (504). While being processed by VTEP A (508A), it is determined that the MAC frame includes information that matches at least one of the requirements specified in the redirect criteria. In response to this determination, VTEP A (508A) intercepts the MAC frame and prepares to redirect the MAC frame towards the service device (504). Specifically, VTEP A (508A) first replaces the original VLAN tag in the MAC frame with a dedicated VLAN tag (i.e., VLAN A tag) associated with the dedicated VLAN (i.e., VLAN A) unique to host A (502A). Next, VTEP A (508A) encapsulates the MAC frame in a VXLAN frame, where the VXLAN frame includes a dedicated VNI (i.e., VNI A) associated with (or mapped to) the dedicated VLAN (i.e., VLAN A) unique to host A (502A). VTEP A (508A) subsequently instantiates a virtual tunnel originating at VTEP A (508A) and terminating at the service VTEP (i.e., VTEP C (508C)) and proceeds to transmit the generated/obtained VXLAN frame towards the service VTEP (508C).

Upon arriving at the service VTEP (508C), the VXLAN frame is decapsulated to obtain the MAC frame enclosed therein. Because the service device (504) is the only other entity, other than host A (502A), associated with the dedicated VNI (i.e., VNI A), and thus the dedicated VLAN (i.e., VLAN A), the service VTEP (508C) determines that the MAC frame needs to be bridged over to the service device (504), which is directly connected to the network element (506C) on which the service VTEP (508C) is executing. In response to this determination, the service VTEP (508C) first replaces the dedicated VLAN tag (i.e., VLAN A tag) in the MAC frame with the original VLAN tag, and then, proceeds to bridge the MAC frame to the service device (504).

At the service device (504), based on the configuration programmed into the service device (504) and the service policies/rules in place, the MAC frame is subjected to one or more service function(s) performed by the service device (504). After performing the service function(s), the service device (504) bridges the MAC frame back to the service VTEP (508C). At this point, the MAC frame retains the original VLAN tag because the service device (504) is only aware of communications using the original VLAN (510).

Back at the service VTEP (508C), the service VTEP (508C) analyzes the MAC frame (i.e., analyzes the L2 header information therein) to: (i) make a first determination as to whether the destination for the MAC frame is a directly connected host; and/or (ii) make a second determination as to whether the destination for the MAC frame is an intercept host or a non-intercept host. As host E (502E) is the destination for the MAC frame, it is eventually determined that host E (502E) is a directly connected host and an intercept host. Further, based on these determinations, the service VTEP (508C) prepares the MAC frame for transmission towards host E (502E). Specifically, the service VTEP (508C) retains the original VLAN tag in the MAC frame (i.e., VLAN O tag). Afterwards, the service VTEP (508C), based on the determination that host E (502E) is directly connected to the network element (506C) on which the service VTEP (508C) is executing, proceeds to bridge the MAC frame to host E (502E).

Embodiments of the disclosure provide a mechanism for inspecting network traffic between end points of a zone. To that effect, one or more embodiments of the disclosure are advantageous over existing methods and/or systems at least because: (i) embodiments of the disclosure do not require data center re-design or reconfiguration to ensure that network traffic between different elements in a L2 broadcast domain is sent through a service device; (ii) embodiments of the disclosure enable the segmentation of a transparent L2 service device into multiple zones (or L2 broadcast subdomains) rather than the typical two zones provided in other existing technologies; and (iii) embodiments of the disclosure harnesses, though improving on, existing technologies for providing additional functionality, and thus, does not require the development of new protocols and/or features in hardware.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for handling media access control (MAC) frames, comprising:
    receiving, by a service virtual tunnel end point (VTEP) and from a source VTEP, a first virtual layer-3 (VL3) frame comprising a dedicated virtual network identifier (VNI);
    decapsulating the first VL3 frame to obtain a first MAC frame comprising a dedicated virtual local area network (VLAN) tag;
    replacing, in the first MAC frame, the dedicated VLAN tag with an original VLAN tag; and
    bridging the first MAC frame to a service device directly connected to a first network element on which the service VTEP is executing.

2. The method of claim 1, further comprising:
    obtaining, from the service device and after the service device performs a service function, the first MAC frame comprising the original VLAN tag;
    making a determination that a destination for the first MAC frame is not a directly connected host and that the destination is an intercept host;
    replacing, in the first MAC frame and based on the determination, the original VLAN tag with a common intercept VLAN tag;
    encapsulating the first MAC frame in a second VL3 frame comprising a common intercept VNI; and
    transmitting the second VL3 frame towards a destination VTEP, wherein the destination VTEP is executing on a second network element, wherein the destination is directly connected to the second network element.

3. The method of claim 1, further comprising:
    obtaining, from the service device and after the service device performs a service function, the first MAC frame comprising the original VLAN tag;
    making a determination that a destination for the first MAC frame is not a directly connected host and that the destination is a non-intercept host;
    encapsulating, based on the determination, the first MAC frame in a second VL3 frame comprising an original VNI; and transmitting the second VL3 frame towards a destination VTEP, wherein the destination VTEP is executing on a second network element, wherein the destination is directly connected to the second network element.

4. The method of claim 1, further comprising:
obtaining, from the service device and after the service device performs a service function, the first MAC frame comprising the original VLAN tag;
making a determination that a destination for the first MAC frame is a directly connected host; and
bridging, based on the determination, the first MAC frame to the destination, wherein the destination is directly connected to the first network element.

5. The method of claim 1, further comprising:
receiving, from the source VTEP, a second VL3 frame comprising an original VNI;
decapsulating the second VL3 frame to obtain a second MAC frame comprising the original VLAN tag; and
bridging the second MAC frame to the service device.

6. The method of claim 1, further comprising:
receiving, from a source host, a second MAC frame comprising the original VLAN tag; and
bridging the second MAC frame to the service device, wherein the source host is directly connected to the first network element.

7. The method of claim 1, wherein the first VL3 frame is a virtual extensible local area network (VXLAN) frame.

8. A system, comprising:
a service device;
a plurality of network elements operatively connected to one another and the service device;
a source virtual tunnel end point (VTEP) executing on a first network element of the plurality of network elements; and
a service VTEP executing on a second network element of the plurality of network elements, and configured to:
receive, from the source VTEP, a first virtual layer-3 (VL3) frame comprising a dedicated virtual network identifier (VNI);
decapsulate the first VL3 frame to obtain a first media access control (MAC) frame comprising a dedicated virtual local area network (VLAN) tag;
replace, in the first MAC frame, the dedicated VLAN tag with an original VLAN tag; and
bridge the first MAC frame to the service device, wherein the service device is directly connected to the second network element.

9. The system of claim 8, further comprising:
a destination VTEP executing on a third network element of the plurality of network elements,
wherein the service VTEP is further configured to:
obtain, from the service device and after the service device performs a service function, the first MAC frame comprising the original VLAN tag;
make a determination that a destination for the first MAC frame is not a directly connected host and that the destination is an intercept host;
replace, in the first MAC frame and based on the determination, the original VLAN tag with a common intercept VLAN tag;
encapsulate the first MAC frame in a second VL3 frame comprising a common intercept VNI; and
transmit the second VL3 frame towards the destination VTEP, wherein the destination for the first MAC frame is directly connected to the third network element.

10. The system of claim 8, further comprising:
a destination VTEP executing on a third network element of the plurality of network elements,
wherein the service VTEP is further configured to:
obtain, from the service device and after the service device performs a service function, the first MAC frame comprising the original VLAN tag;
make a determination that a destination for the first MAC frame is not a directly connected host and that the destination is a non-intercept host;
encapsulate, based on the determination, the first MAC frame in a second VL3 frame comprising an original VNI; and
transmit the second VL3 frame towards the destination VTEP, wherein the destination for the first MAC frame is directly connected to the third network element.

11. The system of claim 8, further comprising:
a destination host directly connected to the second network element,
wherein the service VTEP is further configured to:
obtain, from the service device and after the service device performs a service function, the first MAC frame comprising the original VLAN tag;
make a determination that a destination for the first MAC frame is the destination host; and
bridge, based on the determination, the first MAC frame to the destination host.

12. The system of claim 8, wherein the service VTEP is further configured to:
receive, from the source VTEP, a second VL3 frame comprising an original VNI;
decapsulate the second VL3 frame to obtain a second MAC frame comprising the original VLAN tag; and
bridge the second MAC frame to the service device.

13. The system of claim 8, further comprising:
a source host directly connected to the second network element,
wherein the service VTEP is further configured to:
receive, from the source host, a second MAC frame comprising the original VLAN tag; and
bridge the second MAC frame to the service device.

14. The system of claim 8, wherein each of the plurality of network elements is one selected from a group consisting of a switch, a router, and a multilayer switch.

15. The system of claim 8, wherein the service device is one selected from a group consisting of a network security device, a network filtering device, a network data cache, and a network load balancing device.

16. A non-transitory computer readable medium (CRM) comprising computer readable program code, which when executed by a computer processor, enables the computer processor to:
receive, at a service virtual tunnel end point (VTEP) and from a source VTEP, a first virtual layer-3 (VL3) frame comprising a dedicated virtual network identifier (VNI);
decapsulate the first VL3 frame to obtain a first media access control (MAC) frame comprising a dedicated virtual local area network (VLAN) tag;
replace, in the first MAC frame, the dedicated VLAN tag with an original VLAN tag; and
bridge the first MAC frame to a service device directly connected to a first network element on which the service VTEP is executing.

17. The non-transitory CRM of claim 16, further comprising additional computer readable program code, which when executed by the computer processor, further enables the computer processor to:
  obtain, from the service device and after the service device performs a service function, the first MAC frame comprising the original VLAN tag;
  make a determination that a destination for the first MAC frame is not a directly connected host and that the destination is an intercept host;
  replace, in the first MAC frame and based on the determination, the original VLAN tag with a common intercept VLAN tag;
  encapsulate the first MAC frame in a second VL3 frame comprising a common intercept VNI; and
  transmit the second VL3 frame towards a destination VTEP, wherein the destination VTEP is executing on a second network element, wherein the destination is directly connected to the second network element.

18. The non-transitory CRM of claim 16, further comprising additional computer readable program code, which when executed by the computer processor, further enables the computer processor to:
  obtain, from the service device and after the service device performs a service function, the first MAC frame comprising the original VLAN tag;
  make a determination that a destination for the first MAC frame is not a directly connected host and that the destination is a non-intercept host;
  encapsulate, based on the determination, the first MAC frame in a second VL3 frame comprising an original VNI; and
  transmit the second VL3 frame towards a destination VTEP, wherein the destination VTEP is executing on a second network element, wherein the destination is directly connected to the second network element.

19. The non-transitory CRM of claim 16, further comprising additional computer readable program code, which when executed by the computer processor, further enables the computer processor to:
  obtain, from the service device and after the service device performs a service function, the first MAC frame comprising the original VLAN tag;
  make a determination that a destination for the first MAC frame is a directly connected host; and
  bridge, based on the determination, the first MAC frame to the destination, wherein the destination is directly connected to the first network element.

20. The non-transitory CRM of claim 16, further comprising additional computer readable program code, which when executed by the computer processor, further enables the computer processor to:
  receive, from the source VTEP, a second VL3 frame comprising an original VNI;
  decapsulate the second VL3 frame to obtain a second MAC frame comprising the original VLAN tag; and
  bridge the second MAC frame to the service device.

* * * * *